Dec. 10, 1968    K. S. ETTRE    3,415,705
MACHINES FOR TAPE TRANSFER
Filed Dec. 30, 1964    2 Sheets-Sheet 1
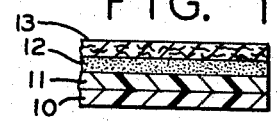
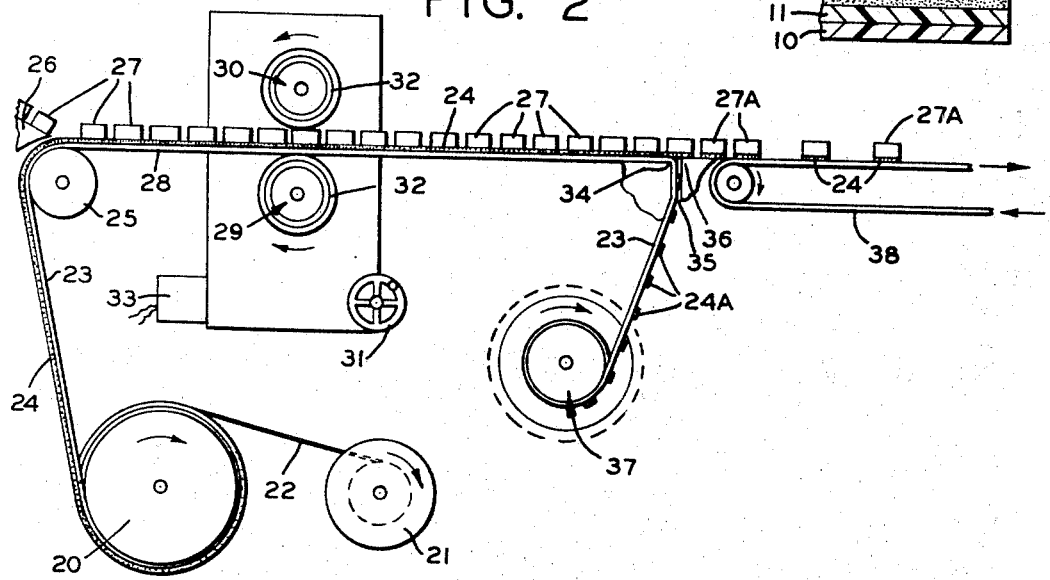
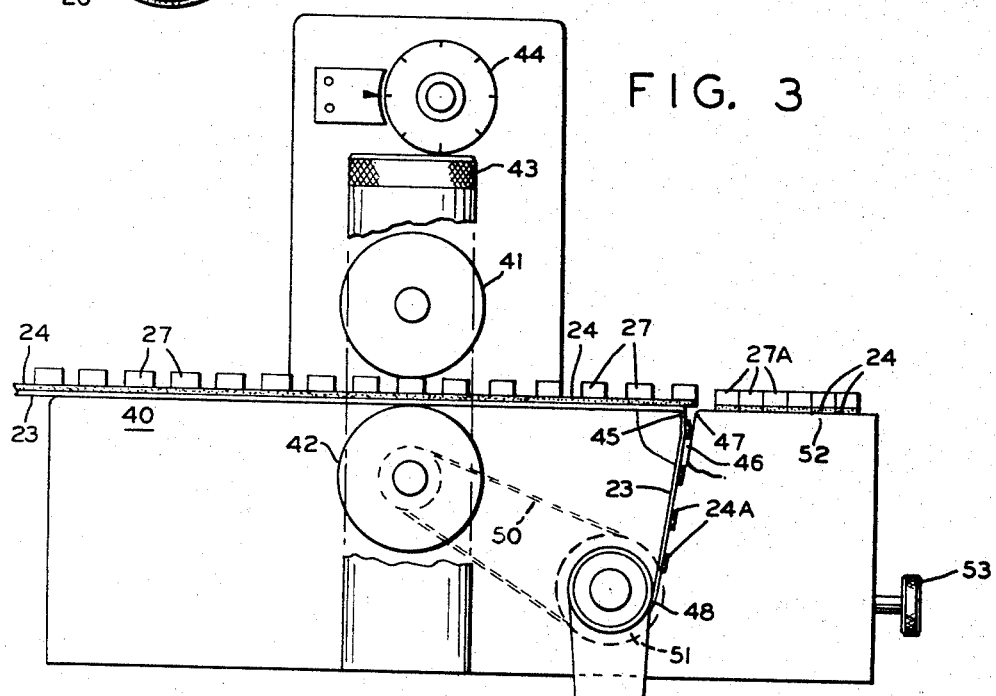
INVENTOR.
KITTY S. ETTRE Dec. 10, 1968  K. S. ETTRE  3,415,705
MACHINES FOR TAPE TRANSFER
Filed Dec. 30, 1964  2 Sheets-Sheet 2
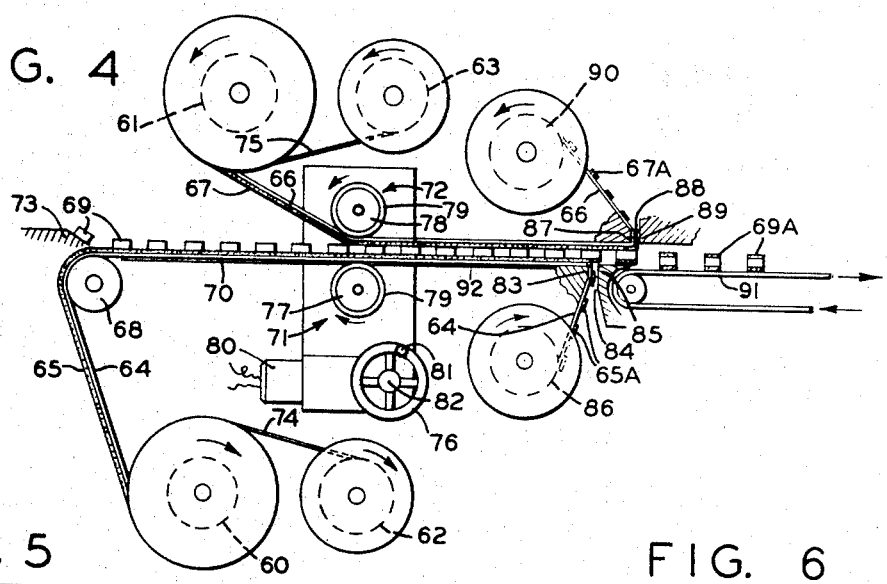
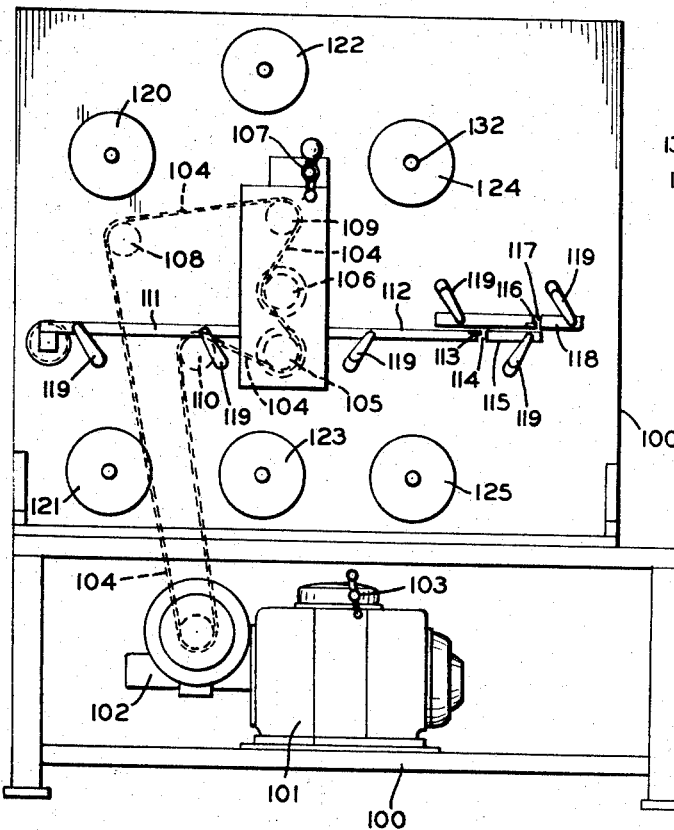
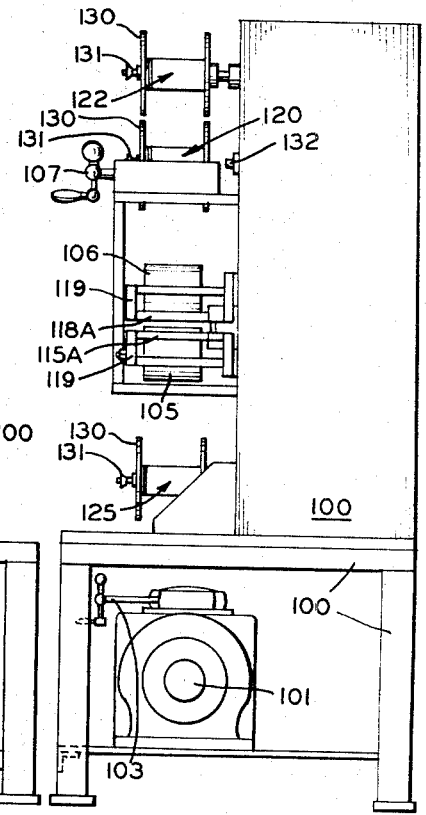
INVENTOR.
KITTY S. ETTRE
BY

United States Patent Office

3,415,705
Patented Dec. 10, 1968

3,415,705
MACHINES FOR TAPE TRANSFER
Kitty S. Ettre, Stamford, Conn., assignor to
Vitta Corporation, Wilton, Conn.
Filed Dec. 30, 1964, Ser. No. 422,135
1 Claim. (Cl. 156—540)

ABSTRACT OF THE DISCLOSURE

The invention is concerned with an automatic machine for continuously processing the coating of at least one side surface of each of a succession of parts to be coated with coating material carried by a transfer tape of the four-layer type consisting of a first carrier layer, a second transfer coating material containing layer, a third adhesive layer, and a fourth protective layer covering the adhesive layer, and contemplates the provision of means to bring the succession of parts to be coated and the transfer tape from a feeding source in the case of the parts to be coated and from a tape roll in the case of the transfer tape into juxtaposition for pressure bonding the coating material carried by the transfer tape to the surface of the parts, and further contemplates means to remove the protective layer for the four-layer type transfer tape from its covering relation with the adhesive layer simultaneously with the drawing of the tape from the tape roll, whereby as the tape is brought into juxtaposition with the succession of parts to be coated the adhesive layer is exposed and brought into direct contact with the parts. Following such juxtaposition, the parts and the three-layer remainder tape are drawn between a pair of opposed spaced pressure rollers, one in contact with the parts, and the other in contact with the carrier layer of the tape, to thus pressure bond the coating material to the surface of the parts. Following the bonding of the coating layer to the parts by the pressure rollers, means are provided for releasing the carrier layer of the tape from the coated parts in the transport of the coated parts to a coated parts receiving means and of the carrier layer of the tape to tape take-up reel means.

---

This invention relates to a machine process to apply transferable tape more particularly to machines suitable for applying transferable tapes to flat or butt areas of ceramics, metallic or non-metallic materials to be coated.

Tape transfer is a dry method to produce thin and extremly accurate layers of coatings of various materials on entire surfaces or in patterns. The tape transfer method in producing thin and accurate layers is known to be performed by hand application. Mechanization of the process was not solved yet but would be highly desirable to adopt this very accurate and versatile method to mass production. Such tape transfer machines would have the advantage that the tape transfer to produce coated areas could be performed instead of the presently used hand application by a machine. Such a machine, a machine for tape transfer, would increase production speed as compared to manual operation, reduce production costs, make the process more uniform and enable the transfer of the tape to both sides of a piece to be coated simultaneously.

Previously, so-called "wet" techniques such as painting, spraying or silk screening were utilized to apply thin layers of materials on a piece to be coated. These methods were used in applying metalizing layers on ceramics or other dielectrics or to produce glazed or enameled metal or ceramic surfaces. These techniques differ only in the method of application of the e.g. metalizing or glazing material; however, the basic idea is similar because in all cases a fluid mixture is utilized. The mechanization of these methods especially in the case of silk screening process could result in a fairly high speed production, but to increase the speed or to coat small parts in the order of 0.050″ O.D. is increasingly difficult due to the inherited difficulties in the accurate application of a liquid to a solid surface. Other problems, such as variations in thickness or density of the applied coating and for example the "curling" effect on the edges of flat surfaces due to the effect of surface tension, makes the liquid methods in cases unuseful for production or automation.

With the introduction of the tape transfer technique, a novel and "dry" method was invented to produce thin layers of various materials on the parts to be coated. The production of transferable tapes and the tape transfer method to produce metalized, glazed, glass or insulator surfaces is considered here per se known and was described for example in a copending application Ser. No. 377,998 by the same inventor and filed on June 25, 1964.

In the thin film deposition method known as tape transfer techniques, the layers such as metalizing, glazing, insulating or resistive layers are prefabricated in a dry form as a tape on a carrier layer and are transferred from this carrier to the surface to be coated with help of a suitable agent. This agent could be an adhesive. The most important feature of this method is that it eliminates the use of the uncontrollable liquid suspensions. With this new technique, the thickness and density of the produced layer can be controlled very closely, accurate placement of the layer is achieved and all problems described in connection with the liquid type application techniques are eliminated.

The methods of the production of the transferable tapes are considered per se known and not claimed in this invention. These transferable tapes are usually composed of the following layers: (a) a carrier layer on which a heavily loaded layer (b) is removably attached. This heavily loaded layer contains the mixture of specific material, for example, a glass frit, metalizing metals, or ceramic insulator powders or a mixture of them with suitable binders and plasticizer which organics may or may not burn out, depending on the type of application of the tape. This removably attached layer is coated with an adhesive layer and finally the adhesive coated tape is covered with a protective paper which is easily removed. Several combinations of this layer can be envisioned and it is also possible that this layer is not obtained in the above form but they have to be laminated prior to their application to the parts to be coated. The general principle, however, is that the transferable tape consists of a carrier and a transferable layer removably attached thereto and that this removably attached layer is made pressure sensitive. This means that if parts are placed on it and suitable pressure is applied to them, they adhere to the tape. If the pressure was properly applied, the parts are picked up by hand from the tape; the tape removably attached to the carrier will now adhere to the parts where it contacted the tape and will stay on the carrier where it was not contacted. This hand operation, however, is sufficient only for small production but is inadequate for large quantity operations.

Moreover, the prior art utilized hand application of the tape transfer to the materials to be coated. Such application method was, e.g., to utilize an arbor press. The transferable tape was laid in this method on the table of the arbor press having its removably attached layer facing upward. The parts to be coated were lain on this transferable tape and the pressure was applied. After the proper pressure was applied and the upper plate of the press was elevated, the ready coated parts were released by simply picking them up from the transfer tap by hand. This hand application is slow and is not applicable to mass production.

Another disadvantage of the hand application is that the application of pressure and especially the release from the tape is not uniform and hence variation in the pressure and release may result in poor transfer of the tape.

It is, therefore, an object of this invention to provide a mechanical means to apply transferable tapes to flat or butt surfaces of ceramics, metals, or other insulator or non-insulator materials.

It is a further object of this invention to provide means for the application of uniform pressure and release of the parts in the mechanized transfer tape coating process.

Another object of this invention is to provide a mechanized process to produce uniform layers on flat or butt surfaces.

A further object of this invention is to assure accurate placement and transfer of the tape to the desired surfaces.

Another object of this invention is to provide a mechanized process whereby both sides of an object can be coated simultaneously.

A further object of this invention is to provide a high speed automatic process of coating one or more flat surfaces of objects simultaneously utilizing tape transfer technique.

Other objects of the invention will become apparent after reading the following specification, when taken in conjunction with the accompanying drawings.

According to this invention the transferable tape itself is used as a production band and carries the parts to be coated through the different steps of the process by a continuous forward movement. These steps of the machine transfer process are: (a) the loading, which takes place in the loading zone; (b) a pressure application, which is applied in the pressure zone; and (c) release, performed in the release zone.

The machine process we describe below takes advantage of the transferable properties of the tape and combines it with a belt type continuous operation. The machine for tape transfer described in this invention utilizes the combination of a loading zone, two parallel acting pressure rollers, and means of release mechanism.

The invention, the automatic tape transfer machine and the automatic tape transfer process will be hereinafter explained in greater detail in reference to the accompanying drawings in which:

FIGURE 1 is a schematic representation of the cross section of a transfer tape;

FIGURE 2 is a schematic of an automatic tape transfer machine for a one-side coating of parts;

FIGURE 3 is a schematic of a hand-operated automatic tape transfer machine;

FIGURE 4 is a schematic of an automatic tape transfer machine for coating both sides of a part simultaneously;

FIGURE 5 is a schematic of the table lift mechanism and roller drive mechanism of a tape transfer machine for coating both sides of a part simultaneously;

FIGURE 6 is the side view of an automatic tape transfer machine for coating both sides of a part simultaneously.

Referring to FIGURE 1 a transfer tape is shown in which a carrier film 10 such as polyethylene, paper or Mylar on which a transferable tape 11 such as glass transfer tape, metalizing transfer tape or resistive transfer tape is formed to be removably attached to said carrier film. An adhesive film 12 is shown to be spread on the transferable tape to facilitate its transfer and finally a protective paper 13 is removably attached to the adhesive coated transfer tape for its protection. This is only one embodiment of the transfer tapes known from prior art and the automatic tape transfer machine is able to handle other embodiments of the transfer tape and it is to be understood that the invention of the machine and process of automatic tape transfer explained in greater detail in the following figures is not limited to said details of the transfer tape shown in FIGURE 1.

Referring to FIGURE 2 the function of the machine can be described as follows: the transfer tape comprising, e.g., the carrier film, the removably attached transferable film coated with an adhesive, and the protective paper is mounted on a reel 20. There is another reel 21 provided to wind up the protective paper 22 removably attached to the transfer tape. The transfer tape comprising now of the carrier 23 and the transferable tape with its adhesive coating 24 is then led over a guiding roller 25 onto the loading zone. The loading zone contains a feeding means 26 from which the parts to be coated 27 are fed onto the adhesive coated side of the transfer tape which now continues on a flat table 28 which table 28 is a part of the feeding means and which table supports the tape; however, it can also be used for loading the parts 27 in absence of feeding means 26. The tape 23, 24 then carries the parts through the pressure roller 29, 30. The gap between the lower pressure roller 29 and upper pressure roller 30 can be adjusted and indicated by a gap adjustor 31. The material of the pressure rollers may be varied according to the nature of the parts to be coated and their shape. I found that the rollers can be made of stainless steel, aluminum, or a metal coated with a plastic, rubber or ceramic shell. The rollers 29, 30 shown in FIGURE 2 are of stainless steel coated with hard rubber layers 32 suitable for tape transfer to wafers. One or both of the rollers may be driven by a motor drive 33 which motor is also used to drive the reels of the machine. The parts 27 passing through the pressure rollers 29, 30 are riding now attached to the transfer tape. The pressure of the rollers is adjusted by the gap adjustor 31 to obtain optimum tape transfer. The parts now because of the applied pressure are strongly adhering to the adhesive side of the transfer tape and proceed on the tape on a flat table 19 to the release mechanism. The release mechanism contains two metal pieces 34 and 36 having sharp corners and are separated by a narrow gap 35. The transfer tape is guided between the two metal edges 34 and 36 through the gap 35 and is attached to the rewind reel 37. In operation the rewind reel 37 pulls the transfer tape 23, 24 under tension through the gap 35 over release edge 34. The parts 27 firmly pressed onto the transfer tape 23, 24 are continuing to proceed over the gap 35, and the transferable layer 24 adhering stronger to the part 27 than to the carrier 23 and, therefore, on the places where pressure was applied releases from the carrier 23 when it is pulled over a sharp release edge 34 and continues to adhere to the part 27 which is stripped by the outer release edge 36 when riding over the narrow release gap 35. The remainder of the transferable tape 24 which was not contacted by a part 27 and was not pressed continues through the gap 35 attached firmly to the carrier 23. The parts now coated 27A and released from the transfer tape when leaving the release edge 36 of the release mechanism may be collected. It is permissible as shown in the figure to use a production belt 38 to carry the coated parts to further processing such as firing in the case of metalized or glazed ceramics. The reels such as the tape reel 20, paper windup reel 21, and rewind reel 37 are driven or pulled by any conventional means not shown in this figure connected to drive means 33 to insure a continuous movement of the transfer tape and its constituents. The release mechanism or at least one of its members such as the inner release edge 34 may be also vibrated to facilitate the release but in most cases it was found that vibrating of the release mechanism is not necessary to obtain an excellent release. It is evident from these drawings that a machine was invented which automates the tape transfer and is integrating the steps of loading, tape feeding, the pressure application by two rollers, and finally the release utilizing a sharp edge and a narrow gap in one single operation which may be carried out continuously.

Another embodiment of a machine to perform the automatic tape transfer process is shown in FIGURE 3. This machine utilizes the loading zone, pressure rollers and release mechanism, but this embodiment of the automatic tape transfer does not permit continuous tape feed and is hand operated. In this machine the transfer tape comprising the carrier film 23 and the adhesive coated removably attached transferable tape 24 is lain on the feed table 40, transferable tape 24 side up. The parts 27 to be coated are loaded on the tape. Two pressure rollers are provided, an upper pressure roller 41 and a lower one 42. The pressure rollers are set by a gap adjustor mechanism 43 and the gap spacing is monitored by a dial indicator 44. Next the parts 27 loaded on the tape at the loading table 40 are passed through the rollers using a preselected pressure. The transfer tape is then fed over the inner release edge 45 into the release gap 46 and fastened to the rewind reel 48. A crank handle 49 is attached to drive the pressure roller 42 by means of a chain 50 and to drive the rewind reel 48 by means of an adjustable friction drive 51. When the crank handle 49 is turned manually, the rollers 41, 42 are rotated and the transfer tape 23, 24 is wound up around the rewind reel 48. The parts 27 to be coated advance from the loading table to the pressure rollers riding on the moving transfer tape and are pressed with a preselected pressure onto the transferable tape, then advance to the release mechanism, where while the tape continues down into the release gap, the transferable layer 24 adheres now to the parts 27 and is released from the carrier at points where the pressure was applied. The ready parts coated with the transferable layer 27A are proceeding over the outer release edge 47 on the stripper assembly 52 and can be removed from there. The carrier with the remainder of the transferable layer is then wound up by means of the rewind reel 48. When the coating of the parts is finished, the stripper table 52 which contains here as a part the outer release edge 47 can be removed from the machine by removing first the hand knob 53 and the rewind reel 48 can be freed from the used tape and the new tape can be attached.

FIGURE 4 shows the schematic of an automatic tape transfer machine which produces parts coated on both sides simultaneously. In this embodiment the lower reel 60 and the upper reel 61 contain the transfer tape. The protective paper 74 and 75 respectively when released from the transfer tape is wound up by means of the lower protective paper windup reel 62 and upper protective paper windup reel 63. The other layers of the transfer tape comprising of the carrier 65 for coating the bottom of the parts to be coated is led around reel 68 onto the loading zone. Parts 69 are loaded onto the tape from feeding means 73 while the tape is moving on the loading table 70 and carried by the transfer tape 64, 65 towards the pressure rollers consisting of a lower pressure roller 71 and upper pressure roller 72. The transfer tape to be utilized to coat the uppe surface of the parts is loaded on reel 61, the protective paper 75 is wound up on reel 63. The carrier 66 and the transferable tape 67 which transferable tape 67 is removably attached to said carrier 66 is fed from its reel 61 between the pressure rollers 71 and 72, thus when parts advance from loading zone 70 into the pressure rollers 71, 72 the bottom of the parts 69 are pressed on the lower transfer tape 64, 65 and the top of the parts are pressed to the upper transfer tape 66, 67 and thus are sandwiched between the two transfer tapes, Coming in contact with their transferable tape side 65 and 67 respectively. The gap between the two pressure rollers 71 and 72 can be adjusted by means of the pressure roll gap adjustor 76. The selection of the proper pressure the pressure roll gap is set for each part 69 according to their height that when entering the pressure rollers the required pressure should be exerted on the parts to insure proper tape transfer. The material of the rollers shown in this embodiment is stainless steel 77, 78, having each a rubber surface coating 79. At least one roller is driven by a motor drive 80. The rollers are moving in the opposite direction to each other to advance the parts uniformly. The pressure roll gap adjustor 76 has a hand crank 81 and a dial indicator 82. The parts 69 pressed uniformly on the lower and upper transfer tape by the pressure rollers are then advancing sandwiched between the now well adhering two transfer tapes to the release mechanism. The transfer tapes and because of the pressure of the rollers the now strongly adhering parts are supported during this advance by a support table 92. The release mechanisms consist of the lower release mechanism and the upper release mechanism. The lower release mechanism in this embodiment is mounted prior to the upper release mechanism. This however can be reversed or set at the same place. The lower release mechanism contains two edged material 83 and 85 separated by a gap 84. In operation the lower rewind reel 86 pulls the lower transfer tape 64, 65 with a slight tension over release edge 83, through gap 84. The parts 69 firmly pressed onto the transfer tapes 64, 65 and 66, 67 are continuing to proceed over the gap 84. The carrier wound continuously by rewind reel 86 carries the remainder of the transferable tape 65A through the gap. The remainder of the transferable tape 65A are those places which were not contacted by the parts to be coated 69. The contacted places of the transferable tape, after the parts 69 were pressed on them by a selected pressure exerted by the pressure rollers 71, 72, adhering now stronger to the parts 69 are releasing from the carrier when pulled around a sharp release 83 edge and continue through the release gap 84 adhering now firmly to the parts to be coated. The parts 69 are now still adhering to the upper transfer tape 66, 67 until it is pulled over upper first release edge 87. Here the upper carrier 66 with the remainder of the transferable tape 67A is pulled under slight tension through the upper release gap 88 by upper rewind reel 90. The parts adhering now to the upper transferable tape are released from the carrier which is facilitated by upper second release edge 89 and the ready coated parts are falling off. The now both side coated parts 69A are then collected or carried away by a production belt 91.

FIGURE 5 represents a schematic view of a tape transfer machine for coating both sides of the parts simultaneously as described in the embodiment shown in FIGURE 4. This embodiment of the machine shows a metal frame 100 on which the entire machine is mounted. It shows the motor drive 101 to which a variable speed drive 102 is adapted. A hand crank 103 is provided to select the proper speed to the automatic tape transfer operation. A chain 104 drive is provided to transmit the force from the motor to the lower 105 and upper 106 pressure rollers. The hand crank 107 is provided to select the proper gap between the two pressure rollers. The gear connection between the hand crank 107 and pressure rollers 105, 106 are not shown. It can be, however, seen that the path of the driving chain 104 is such that it has a minimum slack independent from the selected gap between the pressure rollers 105, 106. This is accomplished by utilizing gears 108, 109 and 110, of which gear 108 is a spring loaded idler. The position of the loading table 111, supporting table 112 including the lower release edge 113, gap 114 and the stripping table 115, furthermore the position of the upper release edge 116, gap 117 and upper stripping table 118 can be adjusted by means of adjustable arms 119 so they should be able to accommodate parts of varioue heights. The upper 120 and lower 121 reels containing the transfer tape, the upper 122 and lower 123 release paper windup reels and the upper 124 and lower 125 rewind reels are also shown on this figure.

FIGURE 6 shows the side view of a machine for automatic tape transfer coating of both sides of a part to be coated. The machine is mounted on a frame 100. The machine is driven by a motor 101, there is a variable speed transmission provided, and the crank 103 is used to select the proper driving speed. This figure shows the lower rewind reel 125, the upper tape reel 120 and the upper paper rewind reel 122 the shaft 132 for the upper rewind reel is shown only, omitting the upper rewind reel from this drawing to allow more details of other parts. The reels are designed to allow fast loading, unloading or changing the reels. This is accomplished by a removable flange 130 and a quick fastener means 131. The lower pressure roller 105 and upper pressure roller 106 as well as the gap adjustor crank 107 are also shown in this figure. The parts 115A and 118A are the ends of the lower and upper stripper table respectively.

It is evident from the figures that the machine can also be used in bringing two different tapes together permanently, if no parts are loaded on the machine and the tapes are fed directly through the two pressure rollers and wound up on the lower rewind reel 125.

From the foregoing, it will be apparent that novel means and methods have been presented in accordance with the objectives of this invention for a process and a machine to perform automatic transfer tape coating of objects. It is to be understood, however, that various changes in the means and methods described may be made by those skilled in the art but not departing from the spirit of the invention as expressed in the accompanying claim.

Having thus described the invention what is claimed is:

1. A strip coating machine, for continuously coating one side surface of a succession of parts to be coated by transfer to said side surface of coating material from a prefabricated transfer tape of the four-layer type consisting of a first carrier layer, a second transfer coating material containing layer separable carried by said first carrier layer, a third adhesive layer upon the side of said transfer layer opposite its carrier layer engaging side, and a fourth protective layer separably covering said third adhesive layer, comprising:

(A) a parts feeding means (26) for feeding the parts to be coated;

(B) a coated parts receiving means (38) for receiving said coated parts from said strip supply reel means
  (a) said coated parts receiving means being spaced from said parts feeding means, and
  (b) a succession of said parts extending between said parts feeding strip supply and coated parts receiving means;

(C) a tape supply reel means (20) for supporting a roll of said four-layer type transfer tape;

(D) a first tape take-up reel means (37) for drawing and receiving said tape from said tape supply reel means;

(E) a second tape take-up reel means (21) for drawing and receiving the fourth protective layer of said four-layer type transfer tape as said tape is drawn from said tape supply reel means, whereby said tape is drawn from said tape supply reel means as a three-layer tape comprising said carrier layer, said transfer layer and said adhesive layer;

(F) guide means (25) for guiding said three-layer tape into juxtaposition to said succession of parts with said third adhesive layer of said tape in engagement with said side surface of said parts to be coated and with said second transfer layer interposed between said carrier layer and said parts;

(G) a pair of opposed spaced pressure rollers (29–30) disposed intermediate said guide means and said coated parts receiving means, one for engagement with said succession of parts and the other for engagement with said carrier layer of said tape, whereby said transfer layer of said tape is presure bonded through said adhesive layer of said tape to coat said side surface of said parts; and, (H) release means (34) disposed between said pressure rollers and said coated parts receiving means for guiding said carrier layer of said tape away from said coated parts in the transport of said coated parts to said coated parts receiving means and of said carrier layer of said tape to said tape take-up reel means.

References Cited

UNITED STATES PATENTS

| | | | |
|---|---|---|---|
| 2,559,649 | 7/1951 | Little et al. | 156—238 |
| 2,946,370 | 7/1960 | Muttera | 156—238 |
| 3,145,514 | 8/1964 | Steffey | 156—233 |

DOUGLAS J. DRUMMOND, *Primary Examiner.*

U.S. Cl. X.R.

156—584